July 30, 1935. G. C. BABCOCK Re. 19,656

FIBERBOARD BOX

Original Filed Aug. 28, 1931 2 Sheets-Sheet 1

INVENTOR.
Guilford C. Babcock
BY Janney, Blair & Curtis
ATTORNEYS.

July 30, 1935. G. C. BABCOCK Re. 19,656

FIBERBOARD BOX

Original Filed Aug. 28, 1931 2 Sheets-Sheet 2

INVENTOR.
Guilford C. Babcock
BY
Janney, Blair & Curtis
ATTORNEYS.

Reissued July 30, 1935 Re. 19,656

UNITED STATES PATENT OFFICE 19,656

FIBERBOARD BOX

Guilford C. Babcock, Morris Township, Morris County, N. J., assignor to Stapling Machines Co., a corporation of Delaware Original No. 1,940,288, dated December 19, 1933, Serial No. 559,944, August 28, 1931. Application for reissue February 26, 1935, Serial No. 8,400

7 Claims. (Cl. 217—12)

This invention relates to wirebound boxes, box blanks and the like.

The main object of the invention is to provide a novel structure of wirebound box such that fiberboard or like material which tends to crumple under strain may be employed in the major areas of the box sides. For instance, a wirebound box made in accordance with this invention may have its side material consisting principally of fiberboard or the like, combined with other elements uniquely coordinated with the side material as presently described; and the resulting box structure in spite of the tendency of the fiberboard to crumple under strain will have a strength far exceeding that of the usual fiberboard carton or of the present form of wirebound fiberboard box. As contrasted with the high efficiency of a box embodying this invention having fiberboard side material combined with other elements to maintain the fiberboard in its normal plane, the ordinary wirebound fiberboard box employing the same fiberboard would be practically useless for any purpose because of the tendency of the fiberboard to crumple and disintegrate under distorting strains. While attaining the objects just referred to, this invention has a further purpose to maintain and enhance the opportunity to provide flexibility and elasticity in the finished box, permitting it to be deformed under stress and to be partly or wholly restored to original shape when the stress ceases, within reasonable limits, all without materially rupturing any of the box parts. This invention is characterized by the fact that thin fiberboard side material is employed, which alone in the ordinary wirebound fiberboard box would have wholly inadequate strength, while additional materials are coordinated therewith at those points in the box structure at which ample strength is required, especially to suit the distinctive functioning and behavior of wirebound fiberboard boxes. Thus a box embodying the present invention is contrasted with the usual wirebound fiberboard box largely in this:—in the usual wirebound fiberboard box the strength of the box is no greater than the strength of the fiberboard which acts like a sheet of paper and crumples and disintegrates when distorted out of its normal plane. While, on the other hand, in the box of the present invention, the fiberboard is held in its normal plane and thus prevented from crumpling and disintegrating under strains which would otherwise destroy the fiberboard.

In the drawings:—

Figure 1:
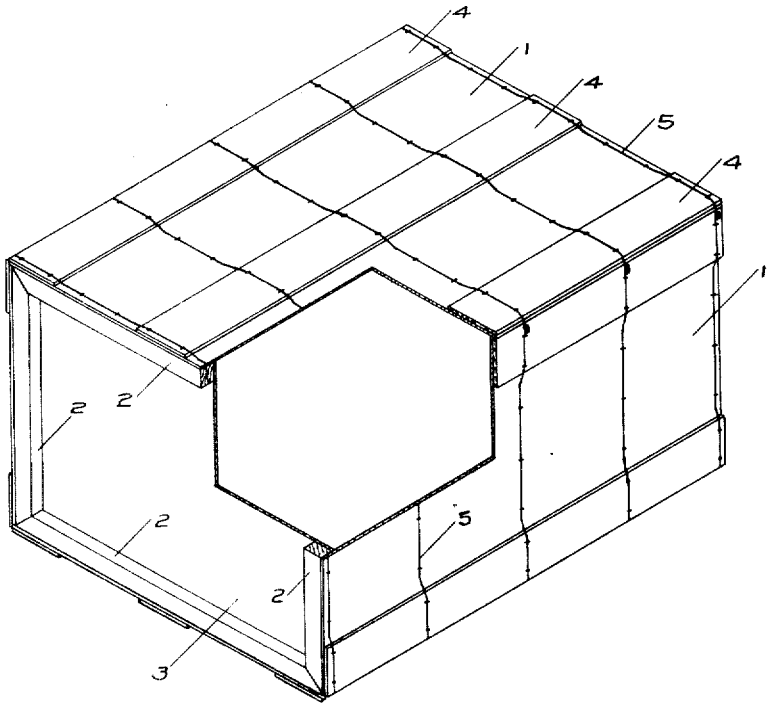
Figure 1 is a perspective view of a wirebound fiberboard box embodying the invention.

Wirebound fiberboard boxes usually consist of a sheet or sheets of fiberboard for the four sides of the box bent integrally over the box corners and supported internally by interior cleats at either end of the box. Binding wires encircle the sides and resist bulging strains. While such boxes are useful for the shipment of certain commodities, their field has been restricted because of their lack of sufficient resistance to crushing strains lengthwise the box, and because of the tendency of the binding wires to bite into and disrupt the fiberboard at the box corners. The present invention is intended to provide a reenforcement for such boxes which will resist crushing strains and preserve the integrity of the fiberboard over the box corners.

The illustrative box comprises four sides and two ends. The sides consist of sheets 1 of fiberboard or the like extending integrally over the box corners to provide closed dust-proof corners. The side-forming fiberboard is supported internally at either end of the box by interior cleats 2 secured to the fiberboard. End sections 3, preferably of fiberboard, are secured to the inner faces of the cleats 2.

To resist crushing strains the fiberboard 1 is reenforced by exterior slats 4, preferably of rotary cut veneer or resawed lumber, which slats are preferably located adjacent to and parallel with the corners of the box and secured to the fiberboard 1 and the cleats 2 by staples. An additional central slat may be provided as shown.

Flexible binders 5 encircle the sides and are preferably stapled to the slats 4, the fiberboard 1 and the cleats 2.

Slats 4 are preferably located close enough to the corner edge of the box to receive the bite of the binders 3 and prevent the binders from cutting into and disrupting the fiberboard.

The fiberboard 1 on the upper side of the box is preferably long enough to overlap the fiberboard on the front side of the box and is held in such overlapping relationship by the slats 4 and binders 2.

Figure 2:
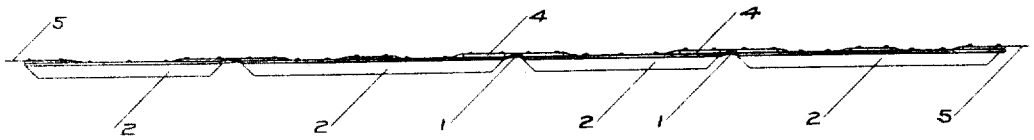
Fig. 2 is a side elevation on a smaller scale of a box blank which, when folded, constitutes the four sides of the box.
Figure 3:
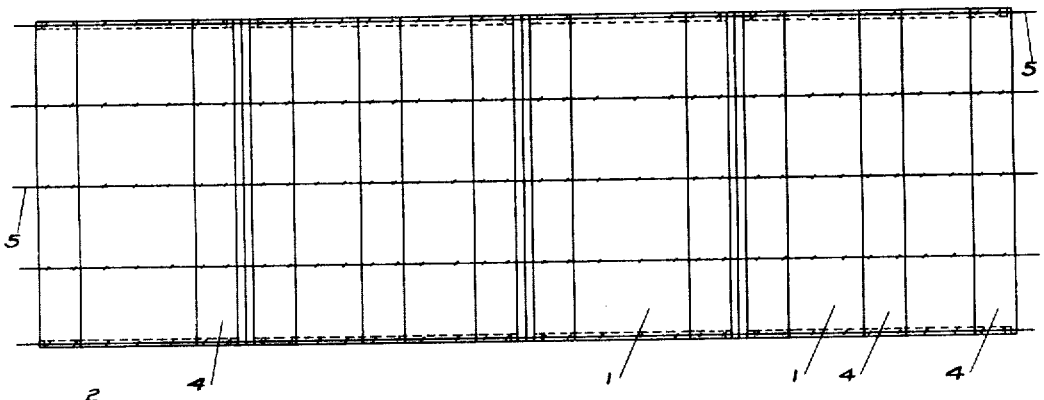
Fig. 3 is a top plan view of the box blank.
Figure 4:
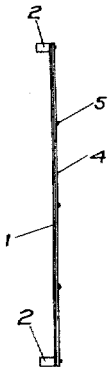
Fig. 4 is an end elevation of the box blank.
Figure 5:
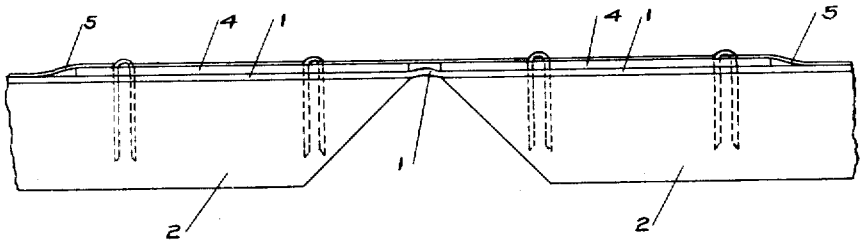
Fig. 5 is an enlarged side elevation of a portion of the box blank showing the relationship of the parts at a potential box corner.
Figure 6:
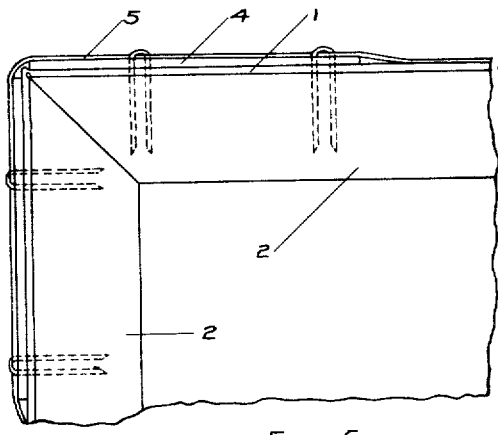
Fig. 6 is an enlarged end elevation of a corner of the box.
Figure 7:
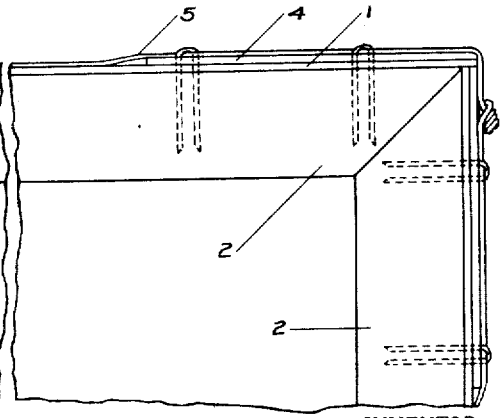
Fig. 7 is a similar view of a closing corner of the box.

As shown in Figs. 2, 3 and 4, the materials for the box sides are preferably assembled and wired in the flat to produce a foldable box blank, which is then folded into box form about the ends and the continuity of the binders completed by joining their ends.

From the foregoing description it will be observed that each side of the box is composed of a pair of cleats 2; thin fiberboard side material overlying the cleats and secured thereto; at least two slats 4, 4 disposed perpendicularly to the cleats and overlying the side material; and the binding wires overlying all the other parts. Certain of the binding wires overlie the cleats and the attaching staples therefor straddle the wires, some staples also securing the wires to the slats and passing through the slats and through the side material and into the end cleats 2, while other staples secure the binding wires to the side material and pass therethrough and into the cleats, the wires thus attached and incorporated into the structural whole with the other parts continuously encircle the box, the ends of the wires being twisted together or otherwise integrated. The wires contribute a major element of strength against stress, much after the manner of similar wires in the ordinary wirebound fiberboard box, but with a substantially different cooperative relationship to the parts as next explained.

With the coordination of parts just described, it will be observed that each side of the box comprises in effect, a four rectangular sided frame composed of two cleats 2, 2 and at least two slats 4, 4. This frame is made secure by the attachment of the slat ends to the cleats. Interposed between the slats and the cleats and secured to both is the thin sheet of fibreboard side material which is itself maintained in its normal plane, and greatly stiffened, protected and strengthened by its coordination with the described four-sided frame and the wires, and thus contributes strength and stiffening to the combination.

When the elements for the several box sides are united in the wired blank and then folded into box form, or otherwise assembled in box form with the continuously encircling wires attached thereto as described,—each side tends to function as a four-sided frame unit carrying the side material and having considerable rigidity, in spite of the character of the fiberboard side material, while the flexible binders and the flexibility of the fiberboard over the box corners permits the several sides to shift somewhat longitudinally in relation to each other. This shifting of the sides in relation to each other may occur under various stresses (for instance, under a diagonal stress when the box is dropped on one corner) setting up a tendency to rupture the fiberboard, which tendency, however, is effectually opposed, within reasonable limits, by the strong four-sided frame structure of each side, coordinated with the side material and wires as described, in spite of the fragility of the side material itself. As already stated, such an arrangement permits the use of fiberboard side material or the like throughout major areas of the box sides, while the thicker rigid slats may be combined therewith, and with the cleats, to occupy only small areas of the sides. Such a distribution of the box elements results in a light economical shipping container.

As used in the specification and claims, the word "fiberboard" is intended to include fiberboard, strawboard and like materials which tend to crumple rather than crack or break under distortion.

It will be understood that the invention is not to be limited to the specific embodiment thereof shown for purposes of illustration as the inventive features may be variously embodied without departing from the invention. For example, in the illustrative box, the fiberboard side material 1 is supported on each side of the box by a frame consisting of two end cleats 2 and two slats 4, and the fiberboard is interposed between the cleats and the slats. The fiberboard will be equally well supported by the frame if the slots are located beneath the fiberboard and between the fiberboard and the cleats. In either construction, the frame functions to maintain the fiberboard in its normal plane and to resist crumpling of the fiberboard under compression strains. Likewise, in either construction the corner slats resist pressure of the binders at the box corners.

This is an application for a reissue of Patent No. 1,940,288 of December 19, 1933. Said patent issued on application Serial No. 559,944 filed August 28, 1931. Said application Serial No. 559,944 was a continuation of application Serial No. 380,128 filed July 22, 1929.

I claim:

1. A wirebound box comprising, in combination, a plurality of box sides each consisting of a four-sided frame composed of two end cleats and two longitudinal slats disposed perpendicularly to the cleats along corner edges of the box side, and a sheet of fiberboard interposed between the slats and the cleats and secured thereto; the several sides being connected with flexible binders and fiber board extending integrally over box corners and the binders, slats, fiberboard and cleats being secured together by staples which straddle the binder, pass through the slats and fiberboard and anchor in the cleats, whereby the fiber board for each side of the box is held in its normal plane by the frame consisting of the two end cleats and the two longitudinal slats, and the slats resist pressure of the binders on the fiberboard at the box corners.

2. A wirebound box comprising, in combination, fiberboard side material for the sides of the box bent integrally over box corners; an interior cleat frame at each end of the box secured to the fiberboard; an exterior slat disposed lengthwise each box side along each corner edge thereof and secured to the fiberboard and end cleats, the cleats and the slats of each box side functioning as a four-sided frame to hold the fiberboard in its normal plane; and flexible binders encircling the box and secured to the slats, the fiberboard and cleats by staples which straddle the binders, pass through the slats and fiberboard and anchor in the cleats, whereby the frame consisting of the cleats and slats resists crumpling of the fiberboard side material and the slats resist pressure of the binders on the fiberboard at the box corners.

3. A wirebound box comprising, in combination, fiberboard side material for the sides of the box bent integrally over box corners; an interior cleat frame at each end of the box; an exterior slat disposed lengthwise each box side along each corner edge of the box; and flexible binders encircling the box; the binders, slats, fiberboard and cleats of each box side being secured together by staples which straddle the binder, pass through the slats and fiberboard and anchor in the cleats, whereby the cleats and slats of each box side function as a four-sided frame to hold the fiberboard in its normal plane and the slats resist pressure of the binders on the fiberboard at the box corners.

4. As an article of manufacture, a wirebound fiberboard foldable box blank comprising, in combination, a sheet of fiberboard long enough to provide, when folded, the several sides of a box; a plurality of separate cleats secured to the underside of the sheet of fiberboard, there being two cleats provided for each intended side of the box and the several cleats being located in two parallel rows and spaced apart in end to end foldable relationship; exterior slats secured to the upper side of the fiberboard along each potential box corner, whereby the fiberboard is held between the cleats and the slats; and flexible binders secured lengthwise the blank to the slats, the fiberboard and the cleats by staples which straddle the binder, pass through the slats and fiberboard and anchor in the cleats, whereby when the blank is folded into box form the fiberboard for each box side is maintained in its normal plane by the cleats, slats and binders, and the slats resist pressure of the binders on the fiberboard at the box corners when the blank is folded into box form.

5. A wirebound box comprising, in combination, fiberboard side material for the sides of the box bent integrally over box corners; an interior cleat frame at each end of the box; a slat disposed lengthwise each box side along each corner edge of the box; and flexible binders encircling the box; the binders, slats, fiberboard and cleats of each box side being secured together by staples which straddle the binders, pass through the slats and fiberboard and anchor in the cleats, whereby the cleats and slats of each box side function as a four-sided frame to hold the fiberboard in its normal plane and the slats resist pressure of the binders at the box corners.

6. A wirebound box comprising, in combination, fiberboard side material for the sides of the box bent integrally over box corners; a supporting frame for each side of the box consisting of two end cleats and two longitudinal slats disposed perpendicularly to the cleats along corner edges of the box side; and flexible binders encircling the box; the binders, fiberboard, slats and cleats being secured together by staples which straddle the binders, pass through the fiberboard and slats and anchor in the cleats, whereby the fiberboard side material for each side of the box is supported by the frame consisting of the two end cleats and the two longitudinal slats and said frame functions to resist crumpling of the fiberboard side material.

7. A wirebound box comprising, in combination, fiberboard side material for the sides of the box extending integrally over box corners; a supporting frame for each side of the box consisting of two end cleats and two reenforcing strips disposed perpendicularly to the cleats along corner edges of the box side, and flexible binders encircling the box; the binders, fiberboard, strips and cleats being secured together by staples which straddle the binders, pass through the fiberboard and strips and anchor in the cleats, whereby the fiberboard side material for each side of the box is supported by the frame consisting of the two end cleats and the two strips and said frame functions to resist crumpling of the fiberboard side material.

GUILFORD C. BABCOCK.